United States Patent [19]

Elberbaum

[11] Patent Number: 5,028,997
[45] Date of Patent: Jul. 2, 1991

[54] TELEVISION CAMERA APPARATUS

[75] Inventor: David Elberbaum, Tokyo, Japan

[73] Assignee: Elbex Video Kabushiki Kaisha, Tokyo, Japan

[21] Appl. No.: 612,966

[22] Filed: Nov. 5, 1990

Related U.S. Application Data

[63] Continuation of Ser. No. 384,295, Jul. 20, 1989.

[51] Int. Cl.$^5$ .................. H04N 7/18; G03B 29/00
[52] U.S. Cl. .......................... 358/108; 358/229; 354/81
[58] Field of Search .............. 358/108, 100, 109, 229; 354/81

[56] References Cited

U.S. PATENT DOCUMENTS

| | | | |
|---|---|---|---|
| 4,233,634 | 11/1980 | Adams | 358/108 |
| 4,320,949 | 3/1982 | Pagano | 358/108 |
| 4,654,703 | 3/1987 | Viera | 358/108 |
| 4,728,839 | 3/1988 | Coughlan et al. | 358/108 |
| 4,918,473 | 4/1990 | Blackshear | 358/108 |
| 4,920,367 | 4/1990 | Pagano | 358/108 |
| 4,945,367 | 7/1990 | Blackshear | 358/108 |

Primary Examiner—Howard W. Britton
Assistant Examiner—Michael H. Lee
Attorney, Agent, or Firm—Graybeal Jackson Richardson & Haley

[57] ABSTRACT

A television camera apparatus for attachment to a frame body such as a wall, a ceiling, a pole or the like comprises a television camera, a base attached to the frame body, support means supported by the base to be rotatable around a first axis extending in one direction and supporting the television camera to be rotatable around a second axis extending in the direction different from the first axis, first drive means for rotating the support means around the first axis relative to the base, and second drive means for rotating the television camera to be rotatable around the second axis relative to the support means, wherein the first drive means includes a first member attached to the support means and extending along a virtual circle around the first axis, and a rotary mechanism having a second member engaged with the first member so as to rotate the first member around the first axis.

8 Claims, 8 Drawing Sheets

TELEVISION CAMERA APPARATUS

This application is a continuation of application Ser. No. 07/384,295, filed July 20, 1989.

BACKGROUND OF THE INVENTION

1. Field of the Invention

This invention relates to a television camera apparatus provided with a pan and tilt positioning mechanism and, more particularly, to a television camera apparatus suitable for the use in a monitoring system.

2. Description of the Prior Art

A television camera apparatus used for a monitoring system is generally so structured that a television camera may selectively and angularly rotate around its vertical and horizontal axes, crossing each other.

A television camera apparatus with the above structure comprises a fixed base member attached to a frame body of a building such as a wall and a ceiling or the like, a rotatable member supported by the base member to be rotatable around a first axis extending in one direction, and supporting a television camera to be rotatable around a second axis orthogonal to the first axis, a first drive mechanism for rotating the rotatable member around the first axis relative to the base member, and a second drive mechanism for rotating the television camera around the second axis relative to the rotatable member. The television camera is disposed on the rotatable member, and the rotatable member is disposed on the base member.

However, in the conventional television camera apparatus, since the base member, rotatable member, television camera and first and second drive mechanisms are placed one upon another, the apparatus increases in size, height and weight. Accordingly, if the rotatable member, television camera and first and second drive mechanisms are placed inside a cover, the apparatus itself becomes larger in size and makes a conspicuous poor appearance.

SUMMARY OF THE INVENTION

It is an object of the present invention to provide a small-sized television camera apparatus, which is small in height and inconspicuous.

According to the present invention, a television camera apparatus for attachment to a frame body such as a wall, a ceiling, a pole or the like comprises a television camera, a base attached to the frame body, support means supported by the base to be rotatable around a first axis extending in one direction and supporting the television camera to be rotatable around a second axis extending in the direction different from the first axis, first drive means for rotating the support means around the first axis relative to the base, and second drive means for rotating the television camera around the second axis relative to the support means, wherein the first drive means includes a first member extending along a virtual circle around the first axis and attached to the support means so as to extend around the first axis, and a rotary mechanism having a second member engaged with the first member so as to rotate the first member around the first axis, and the first member is attached to the support means.

When the first drive means is operated, the support means angularly rotates around the first axis relative to the base, so that the television camera is angularly rotated around the first axis. On the contrary, when the second drive means is operated, the television camera angularly rotates around the second axis relative to the support means. As a result, the visual field of the television camera may be selected at will.

Since the television camera apparatus of the present invention is so structured that the first member extending along the virtual circle around the first axis is rotated to thereby rotate the support means relative to the base, the first member may be disposed around the support means, and the television camera. In consequence, the apparatus reduces in height to obtain a small-sized apparatus.

The second drive means may include a third member like a disk having a portion extending along a virtual circle around the second axis, and a rotary mechanism having a fourth member engaged with the portion of the third member. In this case, the third member is attached to one of the support means and the television camera, and the rotary mechanism of the second drive means is attached to the other.

Preferably, the third member is attached to the support means so as to be adjacent to the television camera in the direction of the second axis, and the rotary mechanism of the second drive means is attached to the television camera. By so doing, since the third member is disposed at the side of the television camera, the apparatus becomes smaller in height.

The base may include a plate-like base member. In this case, preferably, the support means includes a channel-shaped support member provided with a plate portion supported on one surface of the base member to be rotatable around an axis extending in the direction orthogonal to the base member and a pair of support portions extending in parallel with each other from confronting both ends of the plate portion in the same direction, wherein the television camera is supported by the support portions, and the first member extends around the support portions of the support member. By so doing, the axis orthogonal to the base member may be provided as the second axis.

Preferably, the base includes a plate-like base member, and a channel-shaped support member provided with a plate portion attached to one surface of the base member and a pair of support portions extending in parallel with each other from confronting both ends of the plate portion in the same direction, and the support means includes a square barrel-shaped frame member. In this case, the frame member is supported by the support portions of the support member in a pair of opposite side portions of the frame member to be rotatable around the first axis, the television camera is supported by the other pair of opposite side portions of the frame member, and the first member extends around the frame member. By so doing, the axis extending substantially in parallel with the base member is provided as the second axis.

It is preferable that the television camera apparatus further comprises a transparent cover fitted to the base so as to surround the television camera, first and second drive means and support means. As a result, the television camera, first and second drive means and support means may be protected from dust.

It is preferable that the first and second axes are provided as axes crossing each other in the same position on a center line of the television camera. Accordingly, the apparatus becomes smaller in size.

BRIEF DESCRIPTION OF THE DRAWINGS

The foregoing and other objects and features of the invention will become apparent from the following description of preferred embodiments of the invention with reference to the accompanying drawings, in which:

FIGS. 1 through 4 illustrate an embodiment of a television camera apparatus according to the present invention respectively, in which:

FIG. 1 is a perspective view of the television camera apparatus;

FIG. 2 is a plan view of the television camera apparatus when a cover is removed;

FIG. 3 is a front view of the television camera apparatus; and

FIG. 4 is a sectional view taken along a line 4—4 in FIG. 2; and

FIGS. 5 through 8 illustrate another embodiment of the television camera apparatus according to the prevent invention in which:

FIG. 5 is a perspective view of the television camera apparatus;

FIG. 6 is a plan view of the television camera apparatus when the cover is removed;

FIG. 7 is a front view of the television camera apparatus; and

FIG. 8 is a right side view of the television camera apparatus.

DETAILED DESCRIPTION OF THE PREFERRED EMBODIMENTS

Figure 1:
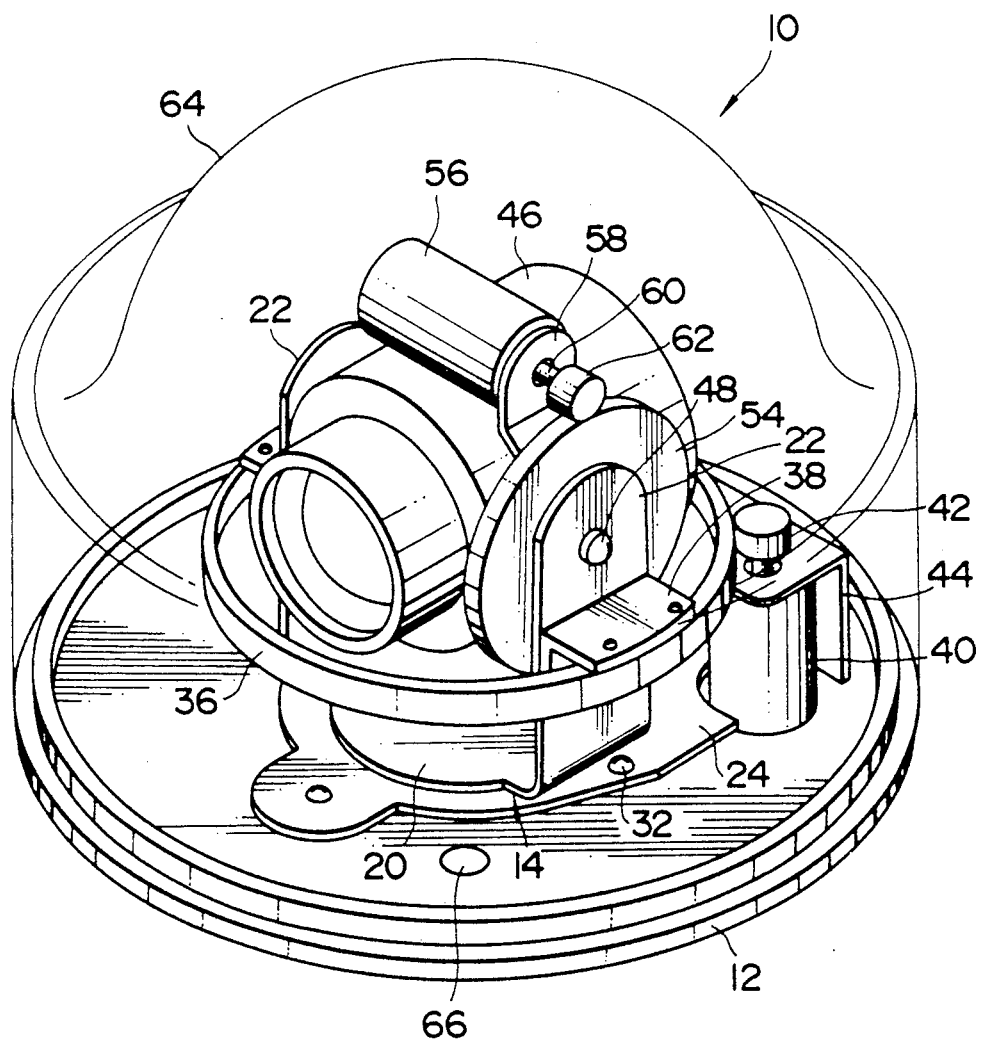
Figure 2:
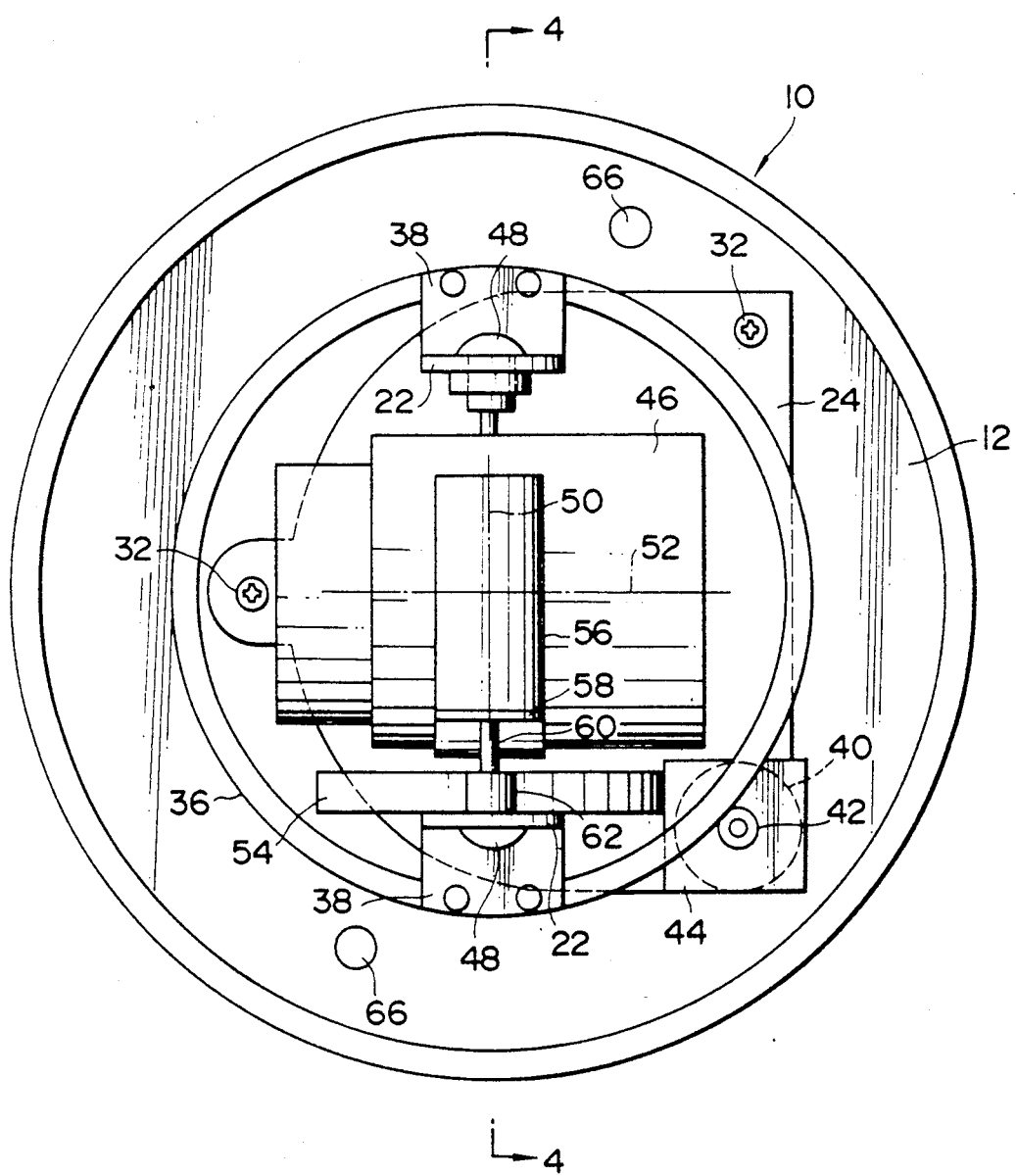
Figure 3:
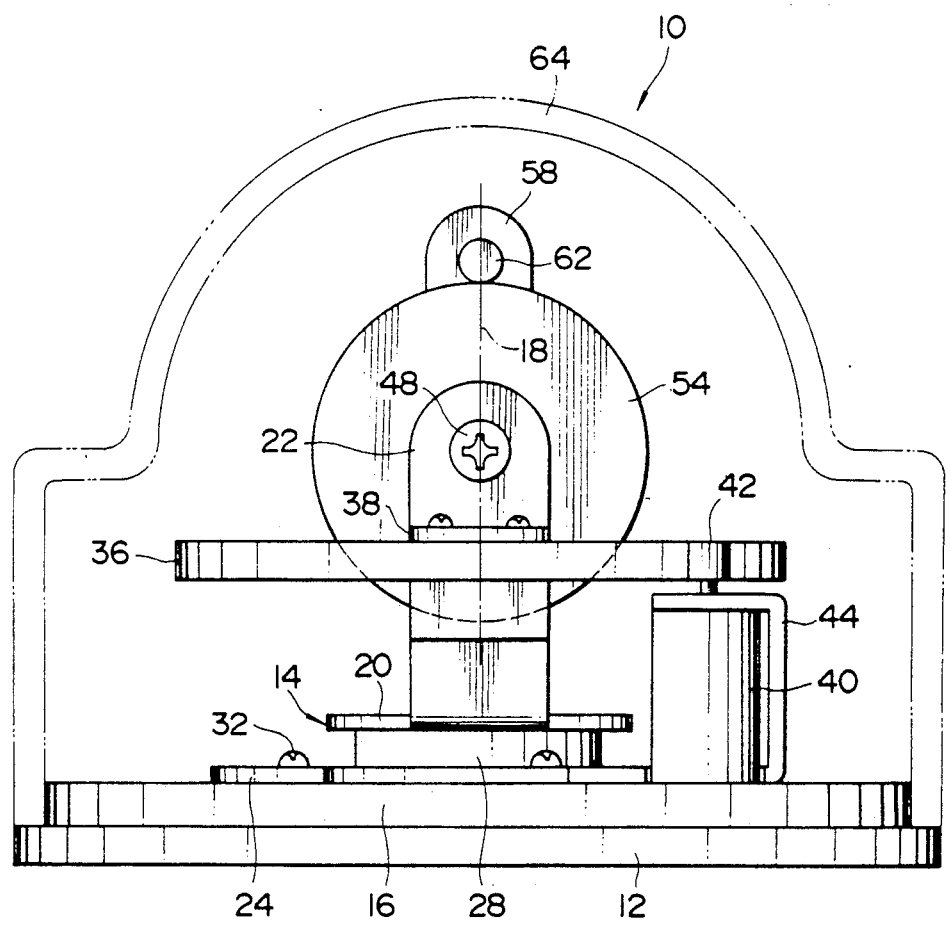
Figure 4:
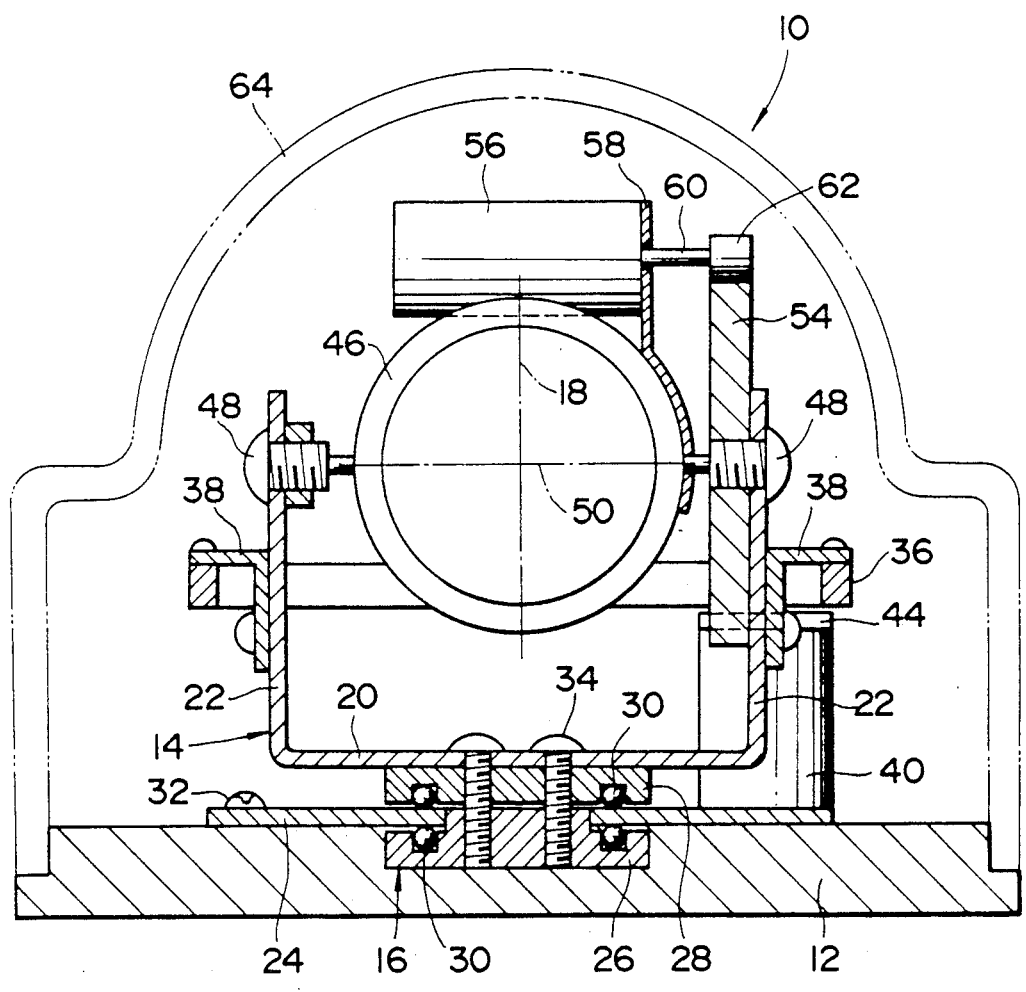

A television camera apparatus 10 as shown in FIGS. 1 through 4 comprises a circular base plate 12 attached to a frame body of a building. A support body 14 is supported by a bearing 16 to one surface of the base plate 12 to be rotatable around an axis 18 extending through the center of the base plate 12 and orthogonal to the base plate 12.

The support body 14 is formed into a channel-like shape to have a plate portion 20 supported by the base plate 12 to be rotatable around the axis 18, and a pair of support portions 22 extending in parallel with each other from confronting both ends of the plate portion 20 to the side opposite to the base plate 12.

As the bearing 16, use is made of a thrust bearing provided with a fixed plate 24 having a hole bored in the center, a pair of rotary plates 26, 28 disposed so as to sandwich the fixed plate 24, and a plurality of balls 30 disposed between the fixed plate 24 and both rotary plates 26, 28. The fixed plate 24 is fixedly attached to the base plate 12 by the use of a plurality of screws 32. On the contrary, both rotary plates 26, 28 are fixedly attached to the plate portion 20 of the support body 14 by the use of a plurality of screws 34. The rotary plate 26 is received in a recess provided in the base plate 12 to be rotatable around the axis 18, and has a projection fitted in the hole of the fixed plate 24 to be rotatable around the axis 18.

A ring 36 is fixedly attached to the support portions 22 of the support body 14 by the use of a plurality of fittings 38. The ring 36 extends along a virtual circle around the axis 18 so as to enclose the support portion 22. A roller 42 is fixedly attached to a rotary shaft of a rotary mechanism 40 including a motor, and is brought into frictional engagement with an outer peripheral surface of the ring 36. The rotary mechanism 40 is attached to a rising portion 44 of the fixed plate 24.

A television camera 46 is supported by a fastening 48 to an end of each of the support portions 22 to be rotatable around an axis 50 extending in parallel with the base plate 12 such that the television camera extends between the support portions 22. The television camera 46 is disposed in a position where a center line 52 of the television camera 46 is located above the ring 36 so as to prevent the ring 36 from coming within the visual field of the television camera 46. The axis 50 extends in the direction orthogonal to the axes 18, 52 coincidentally thereof.

A disk 54 is fixedly attached to an end of one support portion 22. The disk 54 is disposed to the adjacent to the television camera 46 in the direction of the axis 50 and also to adjust a center line of the disk 54 to the axis 50.

A rotary mechanism 56 including a motor is fixedly attached to the television camera 46 by the use of a fitting 58. The rotary mechanism 56 is disposed so that a rotary axis 60 of the rotary mechanism 56 extends along the axis 50 toward the disk 54. A roller 62 brought into frictional engagement with an outer peripheral surface of the disk 54 is attached to the rotary shaft 60.

A cover 64 for protecting the support body 14, bearing 16, ring 36, rotary mechanism 40, television camera 46, disk 54 and rotary mechanism 56 is fitted to the base plate 12. The cover 64 is made of transparent synthetic resin material, and is substantially semispherical in shape.

A plurality of holes 66, through which cables for the use of electric power and electric signals are passed, are bored in the base plate 12. A drive circuit for operating the television camera 46 and both rotary mechanisms 40, 56 may be attached to the base plate 12, or disposed separately from the apparatus 10.

In use, when the rotary mechanism 40 is operated, the ring 36 rotates around the axis 18 by the action of the roller 42, so that the support body 14 and television camera 46 are rotated around the axis 18. On the contrary, when the rotary mechanism 56 is operated, the roller 62 rolls on the outer peripheral surface of the disk 54 and thereby rotates around the disk 54, so that the television camera 46 is rotated around the axis 50 together with the rotary mechanism 56.

The rotary direction of the television camera 46 around the axis 18 and that axis around the axis 50 are defined respectively by the rotary direction of the rotary mechanism 40 and that of the rotary mechanism 56. Further, the rotary range of the television camera 46 around the axis 18 and that axis around the axis 50 are defined respectively by the rotary range of the rotary mechanism 40 and that of the rotary mechanism 56. However, the rotary range within about a 180-degree arc is preferable as far as the cables for the use of the television camera 46 and rotary mechanism 56 may be prevented from twisting. In this case, the rotary range of the television camera 46 around the axis 18 and that around the axis 50 may be restricted by the restriction of the rotary range of the rotary mechanism 40 and that of the rotary mechanism 56 or by the use of a stopper provided on the base plate 12.

Since the axis 18 extends in the direction orthogonal to base plate 12, the television camera apparatus 10 is suitable for the use by mounting on the ceiling such that the base plate 12 is located upward and the cover 64 is located downward. However, the television camera apparatus 10 may also be used by mounting on the wall such that. the axis 18 extends orthogonal to the wall surface.

Figure 5:
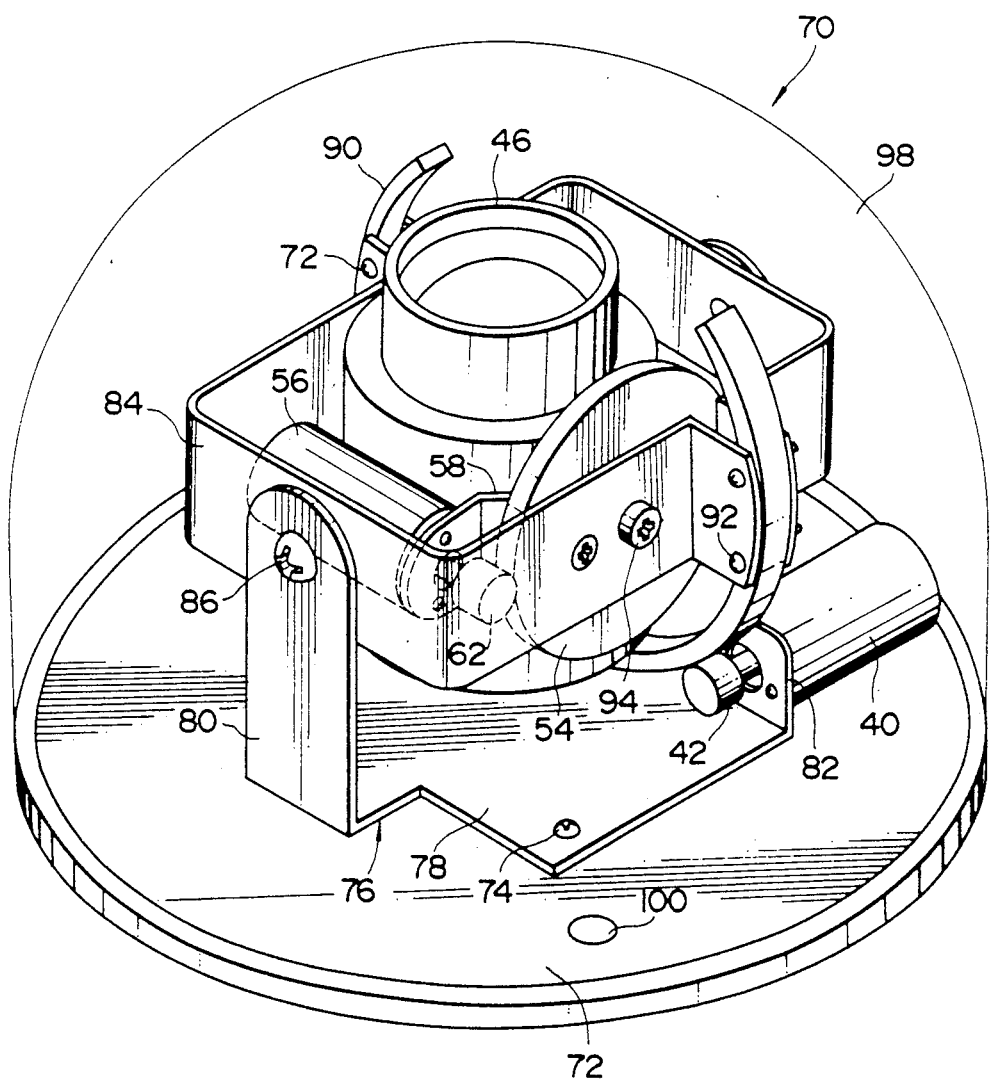
Figure 6:
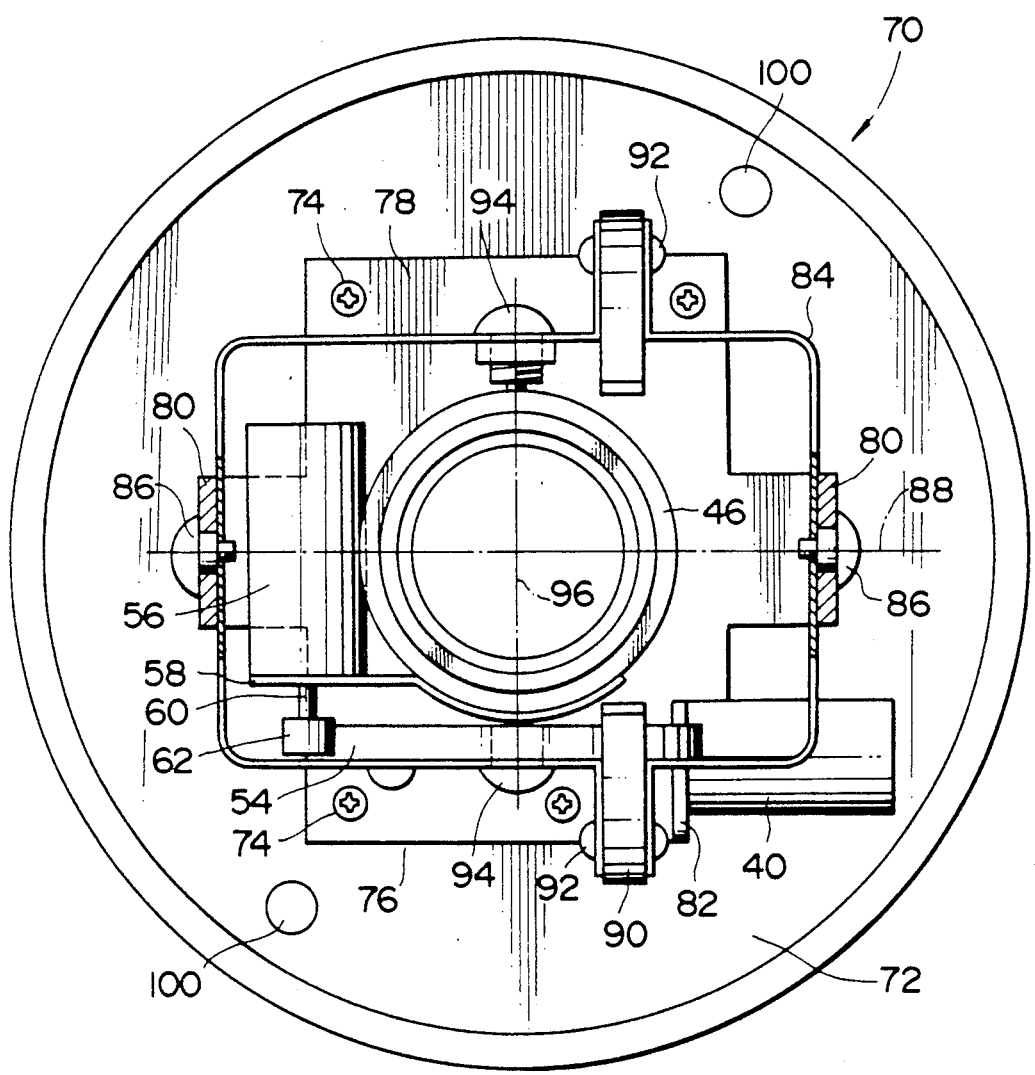
Figure 7:
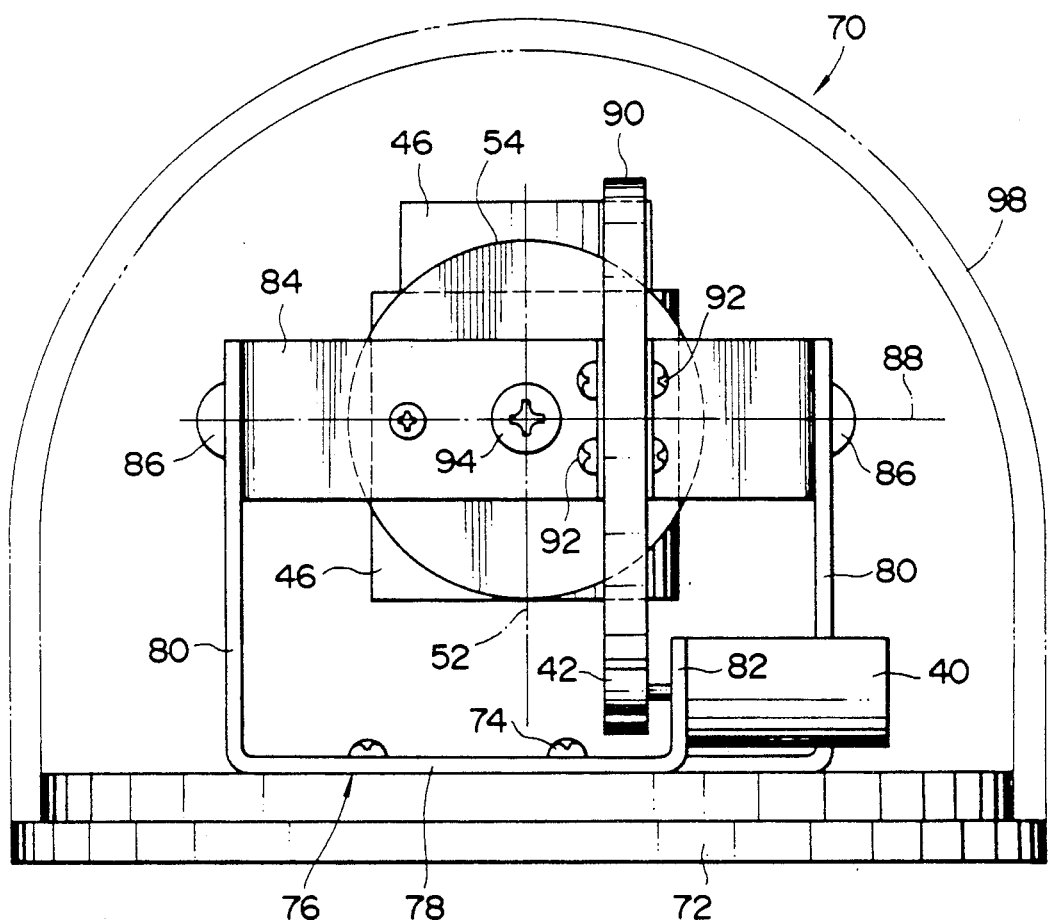
Figure 8:
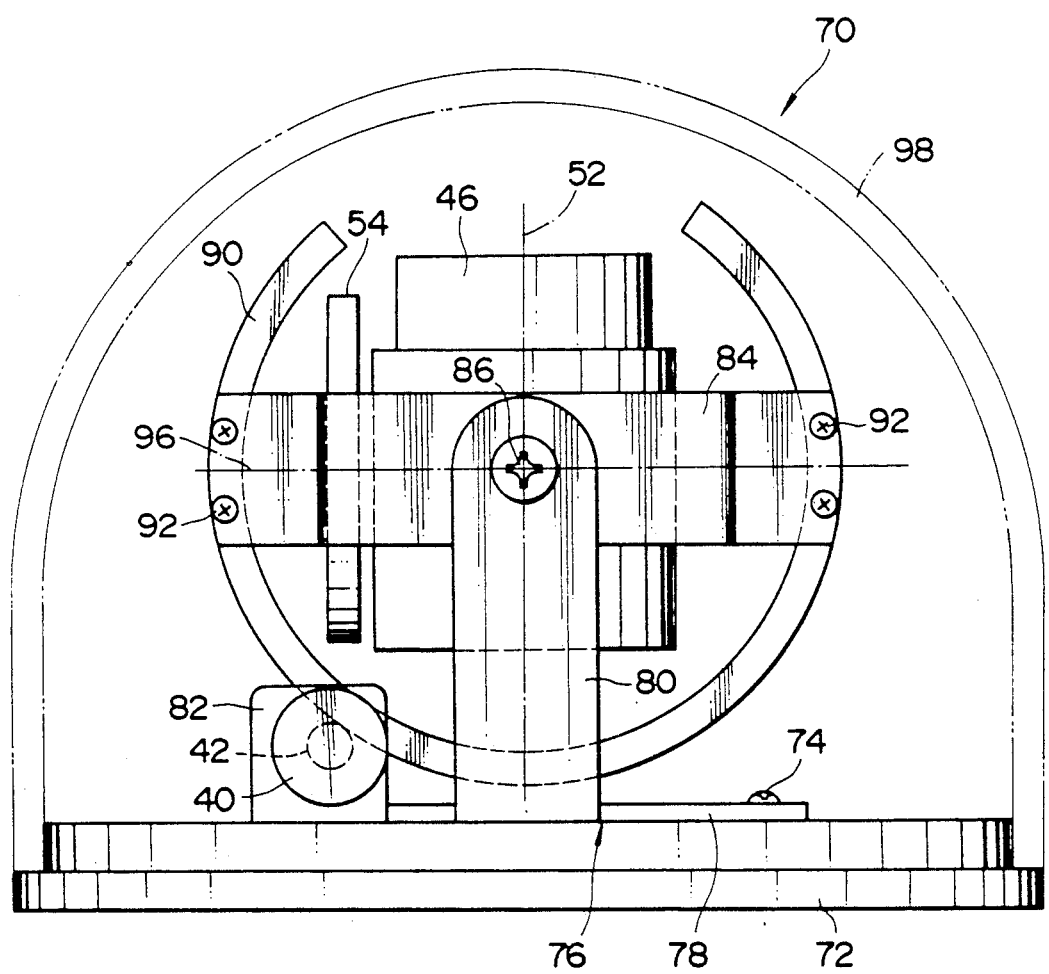

A television camera apparatus 70 as shown in FIGS. 5 through 8 comprises a circular base plate 72 attached to a frame body of a building, and a support body 76 fixedly attached to one surface of the base plate 72 by the use of a plurality of screws 74. The support body 76 is formed into a channel-like shape to have a plate portion 78 supported by the base plate 72, a pair of support portions 80 extending in parallel with each other from confronting both ends of the plate portion 78 to the side opposite to the base plate 72, and a rising portion 82 provided on one corner of the plate portion 78.

A square barrel-shaped frame member 84 is attached to the support portions 80 of the support body 76. The frame member 84 is supported by pins 86 to the support portions 80 in a pair of opposite sides of the frame member to be rotatable around an axis 88 extending in parallel with the base plate 72.

A ring 90 is attached to the frame member 84 by the use of a plurality of screws 92. The ring 90 extends along a virtual circle around the axis 88 so as to enclose the frame member 84. A roller 42 is fixedly attached to a rotary shaft of a rotary mechanism 40 including a motor, and is brought into frictional engagement with an outer peripheral surface of the ring 90. The rotary mechanism 40 is attached to the rising portion 82 of the support body 76.

A television camera 46 is supported by fastenings 94 to the other pair of opposite sides of the frame member 82 to be rotatable around another axis 96 extending in parallel with the base plate 72 so that the television camera 46 extends through the frame member 84. A part of the ring 90 is eliminated so as to prevent the ring from coming within the visual field of the television camera 46. The axis 96 crosses the axis 88 and a center line 52 is the same position.

A disk 54 is fixedly attached to the inner side of the frame member 84. The disk 54 is disposed to be adjacent to the television camera 46 in the direction of the axis 96 and also to adjust a center line of the disk 54 to the axis 96.

A rotary mechanism 56 including a motor is fixedly attached to the television camera 46 by the use of a fitting 58. The rotary mechanism 56 is disposed so that a rotary axis 60 of the rotary mechanism 56 extends along the axis 96 toward the disk 54. A roller 62 brought into frictional engagement with an outer peripheral surface of the disk 54 is attached to the rotary shaft 60.

A cover 98 for protecting the support body 76, ring 90, rotary mechanism 40, television camera 46, disk 54 and rotary mechanism 56 is fitted to the base plate 72. The cover 98 is made of transparent synthetic resin material and is substantially semispherical in shape.

A plurality of holes 100, through which cables for the use of electric power and electric signals are passed, are bored in the base plate 72. A drive circuit for operating the television camera 46 and both rotary mechanisms 40, 56 may be attached to the base plate 72.

In use, when the rotary mechanism 40 is operated, the ring 90 rotates around the axis 88 by the action of the roller 42, so that the support body 76 and television camera 46 are rotated around the axis 88. On the contrary, when the rotary mechanism 56 is operated, the roller 62 rolls on the outer peripheral surface of the disk 54 and thereby rotates around the disk 54, so that the television camera 46 is rotated around the axis 96 together with the rotary mechanism 56.

The rotary direction and the rotary range of the television camera 46 around the axis 88 and those around the axis 96 may be defined respectively by the rotary direction and the rotary range of the rotary mechanism 40 and those of the rotary mechanism 56. However, the rotary range of the television camera 46 around the axis 88 and that around the axis 96 may be preferably restricted by the restriction of the rotary range of the rotary mechanism 40 and that of the rotary mechanism 56 or by the use of a stopper or the like.

Since the axis 88 extends in parallel with the base plate 72, the television camera apparatus 70 is suitable for the use by mounting on the wall such that the axis 88 extends in parallel with the wall surface. However, the television camera apparatus 70 may also be used by mounting on the ceiling such that the base plate 72 is located upward and the cover 98 is located downward.

Further, the engagement of the ring 36 with the roller 42, that of the disk 54 with the roller 62 and that of the ring 90 with the roller 42 may be done by the use of gear teeth, instead of the frictional engagement.

What is claimed is:

1. A television camera apparatus for attachment to a frame body such as a wall, a ceiling, a pole or the like, comprising:

a base for attachment to said frame body and presenting an exposed surface when so attached;

support means supported by said base so as to be rotatable about a first axis extending in one direction and supporting said television camera so as to be rotatable about a second axis extending in the direction intersecting said first axis;

first drive means above the exposed surface of said base for rotating said support means about said first axis relative to said base, said first drive means including: a first member of ring-like form attached to said support means and located thereon within the dimensional extent of the support means in the direction of said first axis and extending around said support means circumferentially of said first axis; and a first rotary mechanism having a second member engaged with the first member so as to rotate the first member about said first axis and fixedly attached to said base; and second drive means for rotating said television camera about said second axis relative to said support means, said second drive means including: a third member having a position extending along a virtual circle around said second axis and fixedly attached to one of said support means and said television camera; and a second rotary mechanism having a fourth member engaged with said position of the third member and fixedly attached to the other of said support means and said television camera.

2. A television camera apparatus according to claim 1, wherein said third member is attached to said support means so as to be adjacent to said television camera in the direction of said second axis, and said second rotary mechanism is attached to said television camera.

3. A television camera apparatus according to claim 1, wherein said base includes a plate-like base member, said support means includes a channel-shaped support member provided with a plate portion supported on one surface of said base member to be rotatable around said first axis extending in the direction orthogonal to said base member and a pair of support portions extending in parallel with each other from confronting both ends of said plate portion in the same direction, said television camera is being supported by said support portions of said support member, and said first member extends around said support portions.

4. A television camera apparatus according to claim 1, wherein said base includes a plate-like base member, and a channel-shaped support member provided with a plate portion attached to one surface of said base member and a pair of support portions extending in parallel with each other from confronting both ends of said plate portion in the same direction, said support means includes a square barrel-shaped frame member supported by said support portions of said support member in a pair of opposite side portions of said frame member to be rotatable around said first axis, said television camera is supported by the other pair of opposite said portions of said frame member, and said first member extends around said frame member.

5. A television camera apparatus according to claim 1, wherein it further comprises a transparent cover fitted to said base so as to surround said television camera, first and second drive means and support means.

6. Television camera apparatus according to claim 1, wherein said first and second axes cross each other in the same position on a center line of said television camera.

7. A television camera apparatus for attachment to a frame body such as a wall, a ceiling, a pole or the like, comprising:
a television camera;
a base including a plate-like base member for attachment to said frame body and presenting an exposed surface when so attached;
channel-like support means including: a plate portion supported by one surface of said base member so as to be rotatable about a first axis extending in a direction intersecting said base member; and a pair of support portions extending parallel to each other in the same direction from opposite end portions of the plate portion, said television camera being supported by both said support portions so as to be rotatable about a second axis extending in a direction intersecting said first axis;
first drive means above the exposed surface of said base for rotating the support means about said first axis relative to said base, including: a first member of ring-like form attached to said support means and located thereon within the dimensional extent of the support means in the direction of said first axis and extending around said support means circumferentially of said first axis; and a first rotary mechanism having a second member engaged with the first member so as to rotate the first member about said first axis and fixedly attached to said base; and second drive means for rotating said television camera about said second axis relative to said support means, including: a third member having a position extending along a virtual circle around said second axis and fixedly attached to one of said support means and said television camera; and a second rotary mechanism having a fourth member engaged with said position of the third member and fixedly attached to the other of said support means and said television camera.

8. A television camera apparatus for attachment to a frame body such as a wall, a ceiling, a pole or the like, comprising:
a television camera;
a base including: a plate-like base member for attachment to said frame body and presenting an exposed surface when so attached;
channel-like support member having a plate portion fixedly attached to one surface side of the base member and a pair of support portions extending parallel from opposite end portions of the plate portion to the same side;
support means including: a square tubular frame member supported by said support portion at a pair of opposite side portions so as to be rotatable about a first axis extending parallel to one surface of said base member and supporting said television camera by another pair of opposite side portions of said frame member so as to be rotatable about a second axis orthogonal to said first axis;
first drive means above the exposed surface of said base for rotating the support means about said first axis relative to said base, said first drive means including: a first member of ring-like form attached to said support means and located thereon within the dimensional extent of the support means in the direction of said first axis and extending around said support means circumferentially of said first axis; and a first rotary mechanism having a second member engaged with the first member so as to rotate the first member about said first axis and fixedly attached to said base; and
second drive means for rotating said television camera about said second axis of said support means, said second drive means including: a third member having a position extending along a virtual circle around said second axis and fixedly attached to one of said support means and said television camera; and a second rotary mechanism having a fourth member engaged with said position of the third member and fixedly attached to the other of said support means and said television camera.

* * * * *